(12) United States Patent
Sanz Martinez et al.

(10) Patent No.: US 8,740,138 B2
(45) Date of Patent: Jun. 3, 2014

(54) AIRCRAFT ENGINE SUPPORTING PYLON

(75) Inventors: Pablo Timoteo Sanz Martinez, Madrid (ES); Diego Folch Cortes, Madrid (ES)

(73) Assignee: Airbus Operations S.L., Madrid (ES)

( * ) Notice: Subject to any disclaimer, the term of this patent is extended or adjusted under 35 U.S.C. 154(b) by 317 days.

(21) Appl. No.: 12/830,749

(22) Filed: Jul. 6, 2010

(65) Prior Publication Data

US 2011/0168836 A1    Jul. 14, 2011

(30) Foreign Application Priority Data

Jan. 14, 2010   (ES) .................................. 201030027

(51) Int. Cl.
*B64D 27/14* (2006.01)
*B64D 27/26* (2006.01)

(52) U.S. Cl.
USPC ................................ 244/54; 244/55; 244/119

(58) Field of Classification Search
USPC ...................... 244/54, 55, 117 R, 119, 123.1; 248/554–557; 60/796, 797
See application file for complete search history.

(56) References Cited

U.S. PATENT DOCUMENTS

| | | | | | |
|---|---|---|---|---|---|
| 2,430,643 | A | * | 11/1947 | Marhoefer | 244/123.7 |
| 2,433,998 | A | * | 1/1948 | Marhoefer | 244/16 |
| 2,981,504 | A | * | 4/1961 | Parker | 244/117 R |
| 3,487,888 | A | * | 1/1970 | Bennett, Jr. et al. | 181/207 |
| 3,756,529 | A | * | 9/1973 | Backlund et al. | 244/87 |
| 4,034,939 | A | * | 7/1977 | Ridley et al. | 244/87 |
| 4,821,980 | A | * | 4/1989 | Clausen et al. | 244/54 |
| 5,065,959 | A | * | 11/1991 | Bhatia et al. | 244/54 |
| 6,513,757 | B1 | * | 2/2003 | Amaoka et al. | 244/123.7 |
| 7,316,372 | B2 | * | 1/2008 | Sarpy | 244/119 |
| 7,726,602 | B2 | * | 6/2010 | Llamas Sandin | 244/54 |
| 7,938,360 | B2 | * | 5/2011 | Nakazawa et al. | 244/54 |
| 7,967,243 | B2 | * | 6/2011 | Verde Preckler et al. | 244/56 |
| 8,016,236 | B2 | * | 9/2011 | Grieve et al. | 244/131 |
| 2008/0149761 | A1 | * | 6/2008 | Nakazawa et al. | 244/54 |
| 2008/0283666 | A1 | * | 11/2008 | Grieve et al. | 244/131 |
| 2009/0084899 | A1 | * | 4/2009 | Kismarton et al. | 244/123.1 |
| 2009/0090811 | A1 | * | 4/2009 | Llamas Sandin | 244/54 |
| 2009/0159741 | A1 | * | 6/2009 | Verde Preckler et al. | 244/56 |
| 2009/0302167 | A1 | * | 12/2009 | Desroche | 244/199.4 |
| 2011/0233326 | A1 | * | 9/2011 | Lafont | 244/54 |
| 2011/0309188 | A1 | * | 12/2011 | Marche | 244/54 |

FOREIGN PATENT DOCUMENTS

| | | | | |
|---|---|---|---|---|
| FR | 966757 | A | 10/1950 | |
| FR | 2939101 | A1 * | 6/2010 | ............ B64D 27/14 |
| GB | 2 268 461 | A | 1/1994 | |
| WO | WO 0157354 | A2 | 8/2001 | |

* cited by examiner

*Primary Examiner* — Joseph W Sanderson
(74) *Attorney, Agent, or Firm* — Birch, Stewart, Kolasch & Birch, LLP

(57) ABSTRACT

An aircraft pylon support system for mounting and supporting aircraft propulsion systems to a fuselage section of an aircraft that includes an internal, central support box disposed within and extending across the interior of an aircraft fuselage, and external support boxes extending laterally into pylons disposed at both sides of the aircraft, each of the internal and external support boxes being made of a composite material and structured as multi-spar boxes containing lateral spars and at least one central spar, wherein the central and lateral support boxes are connected together to provide a continuous interface therebetween with a full transfer of loads therebetween and between any interrupted, intermediate frame members.

19 Claims, 4 Drawing Sheets

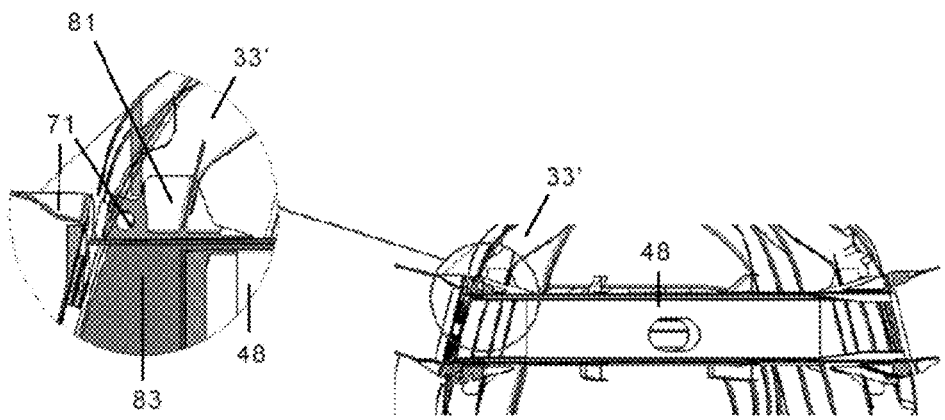
FIG. 7b
FIG. 7
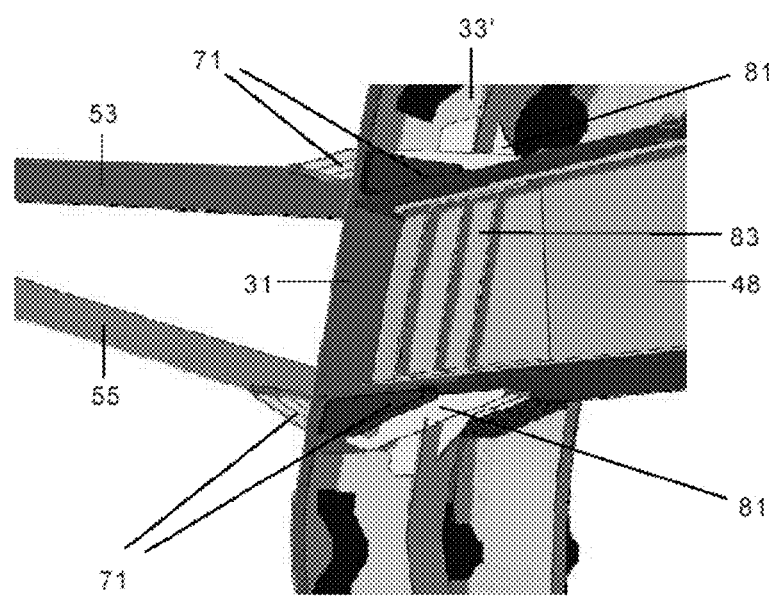
FIG. 7a

AIRCRAFT ENGINE SUPPORTING PYLON

FIELD OF THE INVENTION

The present invention relates to an aircraft with propeller engines located at its rear part and more particularly to the pylons supporting said engines.

BACKGROUND OF THE INVENTION

A commercial aircraft is known (CBA vector 123, SARA, AVANTI, 7J7) that is powered with propeller engines located in the rear part of the aircraft supported by the fuselage by means of non-moving pylons.

One of the problems raised by this aircraft configuration is related to failure events such as a PBR ("Propeller Blade Release") i.e. an event where a blade of one of the propeller engines comes off and hits the fuselage, a UERF (Uncontained Engine Rotor Failure), or any other "Large Damage" event. The design of said rear fuselage shall therefore take into account such events and guarantee its capability for maintaining stability and proceed to a safe landing, i.e. shall be an impact resistant and damage tolerant fuselage.

In the prior art, non-moving pylons attached to the rear part of the aircraft fuselage are basically made with metallic materials.

As it is well known, weight is a fundamental aspect in the aeronautic industry and therefore there is a current trends to use composite material instead metallic material even for primary structures.

The composite materials that are most used in the aeronautical industry consist of fibers or fiber bundles embedded in a matrix of thermosetting or thermoplastic resin, in the form of a preimpregnated or "prepreg" material. Its main advantages refer to:

Their high specific strength with respect to metallic materials. It is the strength/weight equation.
Their excellent behavior before fatigue loads.
The possibilities of structural optimization hidden in the anisotropy of the material and the possibility of combining fibers with different orientations, allowing the design of the elements with different mechanical properties adjusted to the different needs in terms of applied loads.

In this framework, the present invention is addressed to the demand of non-moving engine supporting pylons made of composite materials to be attached to the rear part of an aircraft.

SUMMARY OF THE INVENTION

It is an object of the present invention to provide a supporting device made of composite materials to be attached to an aircraft fuselage part such as a non-moving pylon for an aircraft with propeller engines located at its rear part able to withstand failure events such as a PBR or an UERF event.

This and other objects are met by a device such a pylon attached to an aircraft fuselage part having a closed transversal section of a curved shape comprising a skin and a plurality of frames, in which:

Its structural configuration comprises a central box inside the aircraft fuselage and two external lateral boxes at its both sides made with composite material, the three boxes being structured as multi-spar boxes with upper and lower skins, lateral spars and at least a central spar.

There is a full continuous interface between the central box and the fuselage skin and consequently any intermediate frame is interrupted when it reaches the central box.

The device is attached to the aircraft fuselage keeping a full continuity in the fuselage skin and a full transfer of loads between any interrupted intermediate frame.

In a preferred embodiment, the central box has the same number of central spars than the number of interrupted intermediate frames, said central spars being located in the same fuselage section as the interrupted intermediate frames to provide load path continuity. Accordingly, there is achieved a multi-spar pylon which provides a fail safe state for considered failure events.

In another preferred embodiment, the attachment means comprise rows of tension fittings disposed between, respectively, the upper and lower skins of the external boxes and the upper and lower skins of the central box, with tension bolts crossing the fuselage skin; and rows of tension fittings disposed between, respectively the lateral spars of the external boxes and the lateral spars of the central box with tension bolts crossing the fuselage skin. Accordingly, an efficient piano-type union is achieved between the central and the lateral boxes that allows a full continuity of the fuselage skin.

In another preferred embodiment, the attachment means also comprise attachment fittings with bolts disposed between the interrupted intermediate frames and the central spars of the central box. Thus an efficient union between the central box and the interrupted frames is achieved which allows a full transfer of loads between them.

In another preferred embodiment, the device is a pylon located in the aircraft rear fuselage and supporting the aircraft propulsion system containing propeller blades, and having the central box disposed within the mid fuselage section.

Other characteristics and advantages of the present invention will be clear from the following detailed description of embodiments illustrative of its object in relation to the attached figures.

DESCRIPTION OF THE DRAWINGS

FIG. 7 is a perspective view of an internal section of the pylon central box, FIG. 7a is enlarged view of its interface with the fuselage and FIG. 7b is an enlarged view of one of the upper zone of said interface.

DETAILED DESCRIPTION OF THE INVENTION

Figure 1:
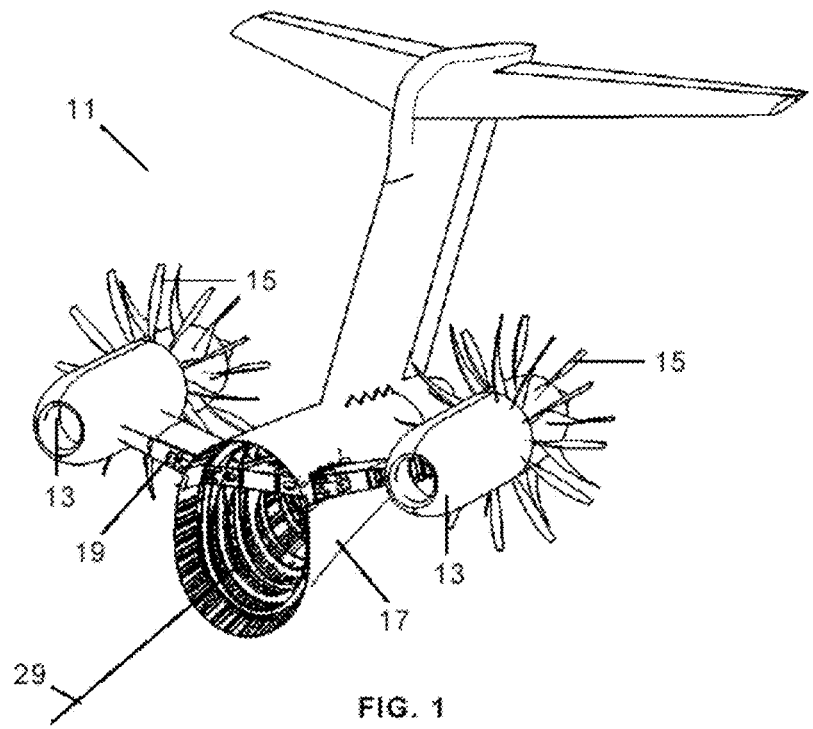
FIG. 1 is a partial perspective view of an aircraft with a propeller propulsion system attached to the rear fuselage through an upstream pylon according to the present invention.

In an aircraft 11 having a propulsion system 13 with propeller blades 15 attached to the rear fuselage 17 by means of an upstream pylon 19, the rear fuselage 17 shall be an impact resistant and damage tolerant fuselage.

The pylon 19 is a high loaded structure due to the big distance between the propulsion means 13 and the fuselage 17. Particularly, the interface between the fuselage 17 and the pylon 19 is affected by high torsional and bending moments and, in cases of crash landing and dynamic landing, to high thrust and vertical loads. On the other hand, the pylon 19 should be a structure suitable to be replaced in cases of very different events such as damages due to disc debris events, fire, fatigue failures or engine replacements.

Figure 2:
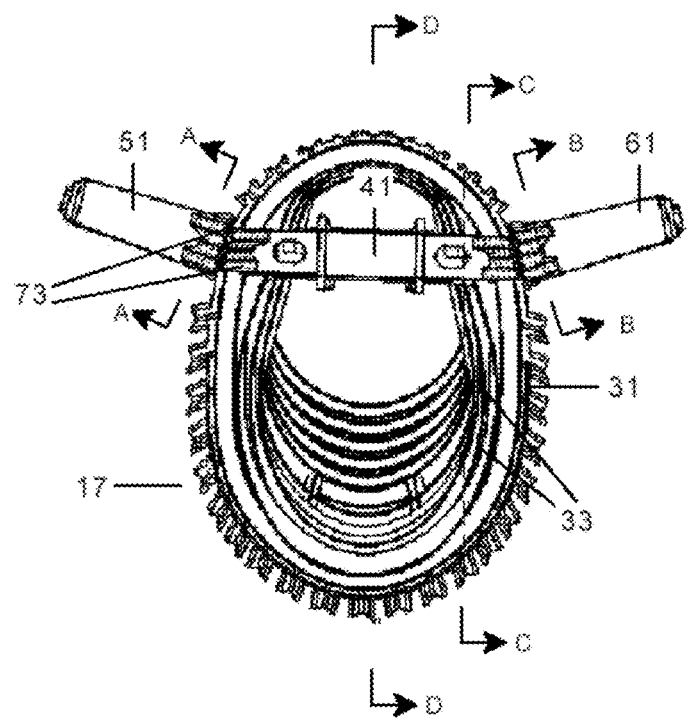
FIG. 2 is a frontal view of the aircraft shown in FIG. 1.
Figure 3:
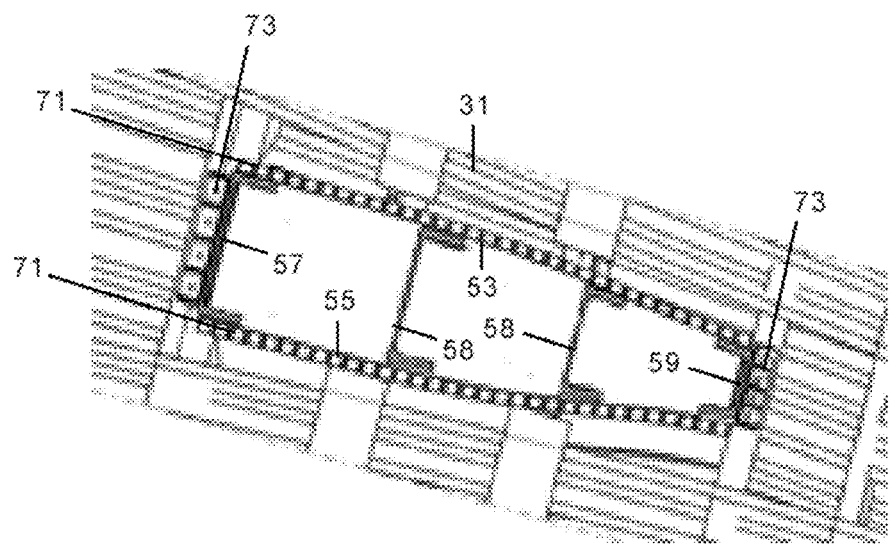
FIGS. 3, 4, 5 are sectional views of FIG. 2 following, respectively, planes A-A, B-B and C-C.
Figure 4:
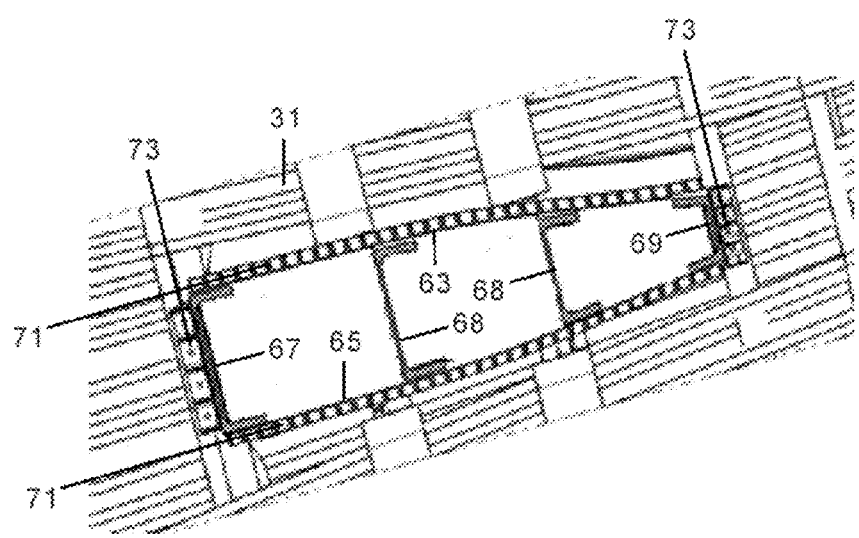
Figure 5:
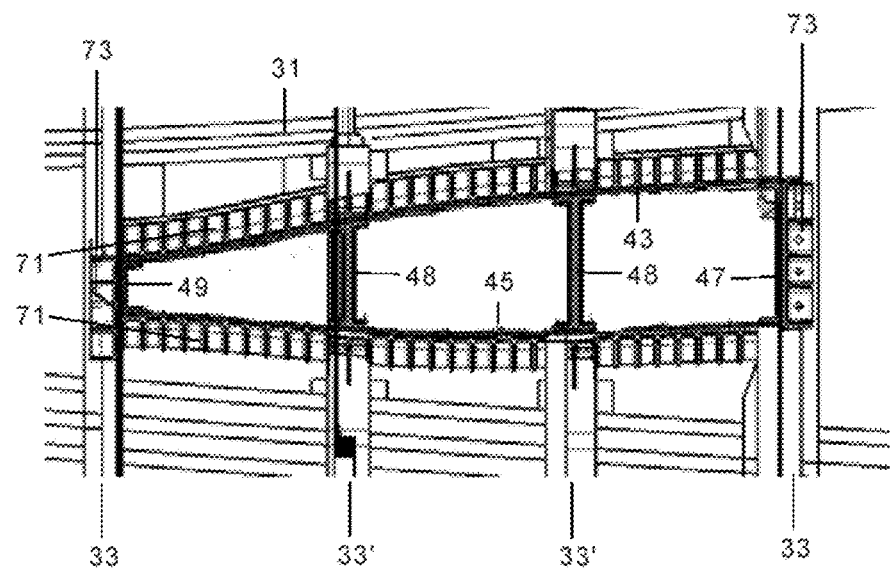
Figure 6:
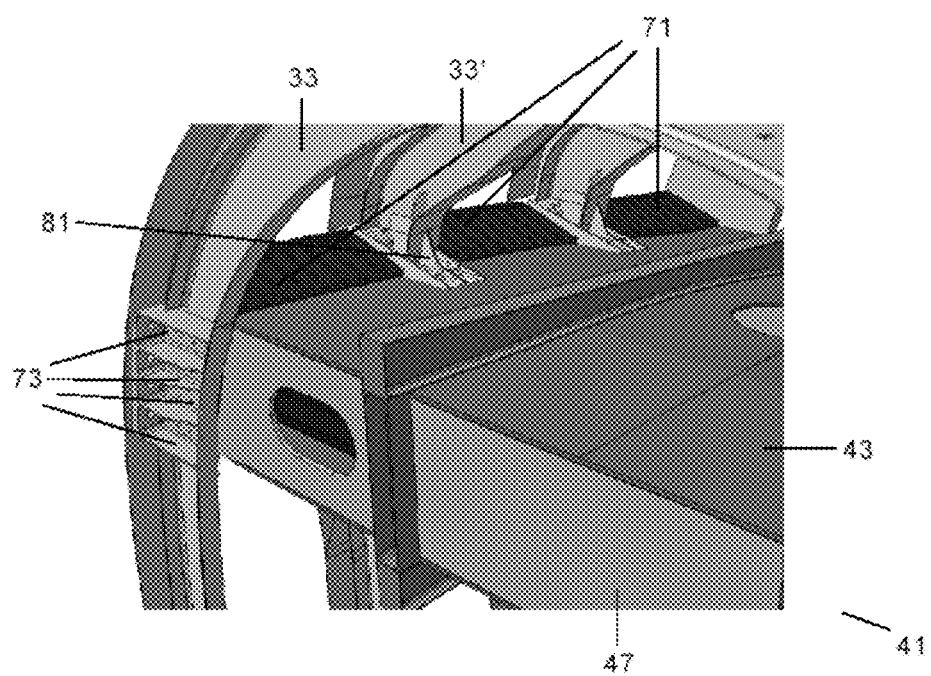
FIG. 6 is a schematic partial perspective view of the pylon central box showing its attachment means to the frames and to the external lateral boxes.

As illustrated in FIGS. 1-2, in the pylon 19 attachment zone, the rear fuselage 17 has generally a close transversal section of a curved shape with at least a vertical symmetry plane D-D and a central longitudinal axis 29 and its structure comprises a skin 31 and frames 33 dimensioned for maintaining the aircraft stability required to proceed to an aircraft safe landing in the event of the release of a propeller blade 15 or any other of the above-mentioned failure events.

Following FIGS. 2-5 it can be seen that in a preferred embodiment according to the invention, the pylon 19, fully made with composite material, comprises a central box 41 inside the aircraft fuselage 17 and two external lateral boxes 51, 61 at its both sides that are attached to the aircraft fuselage 17 at medium height in a rigid manner keeping a full continuity in the fuselage skin 31. In this respect it shall be noted that in the prior art the fuselage includes openings allowing the passage of the pylon supporting the propulsion system.

The three boxes 41, 51, 61 are configured as multi-spar boxes with upper and lower skins 43, 45; 53, 55; 63, 65. Both the lateral spars 57, 59; 67, 69 and the central spars 58; 68 of said lateral boxes 51, 61 have a C-shaped configuration.

The lateral spars 47, 49 of the central box 41 have a C-shaped configuration and the central spars 48 of the central box 41 have a double T-shaped configuration (a suitable configuration for providing continuity to the intermediate frames 33' interrupted by the central box 41).

The central box 41 is joined to the external boxes 51, 61 by means of:

Rows of tension fittings 71 between, respectively, the upper and lower skins 53, 55; 63, 65 of the external boxes 51, 61 and the upper and lower skins 43, 45 of the central box 41 with tension bolts crossing the fuselage skin 31. The tension fittings 71 are connected to said upper and lower skins 53, 63, 43; 55, 65, 45 by means of shear rivets.

Rows of tension fittings 73 between, respectively the lateral spars 57, 59; 67, 69 of the external boxes 51, 61 and the lateral spars 47, 49 of the central box 41 with tension bolts crossing the fuselage skin 31. The tension fittings 73 are connected to said lateral spars 57, 67, 47; 59, 69, 49 by means of shear rivets.

The central box 41 is therefore joined to the external boxes 51, 61 by means of a so-called piano union.

The union between the central box 41 and the intermediate frames 33' interrupted by the pylon 19 is made as shown in FIGS. 7, 7a and 7b by means of the tension and shear fitting 81 joined to the web and inner flange of the intermediate frame 33' and the back fitting 83 joined to a central spar 48 and to the central box upper and lower skins 43, 45 by means of shear rivets. The tension and shear loads are transmitted from the tension and shear fitting 81 to the back fitting 83 by means of bolts. On the other hand the fuselage skin 31 provides continuity to the outer flange of the intermediate frame 33'.

In the embodiment just described the external boxes 51, 61 have C-shaped spars but the skilled man will readily understand that the invention is also applicable to boxes with Double T-shaped spars, X-shaped spars, Double Lambda-shaped spars, Double Pi-shaped spars, W-shaped spars, Omega-shaped spars, or even a corrugated spar box structure.

On the other hand, it can be noted that its central spars 58, 68 does not have any specific role in the union with the central box 41 in no-damage conditions so that its number and position depends only on dimensioning considerations regarding the external boxes 51, 61. In damage events, the mid spars have the role of closing the torsion boxes.

Regarding the central box 41, its lateral spars 47, 49 have the same C-shaped configuration than the lateral spars 57, 59; 67, 69 of the external boxes. Any other configuration of said lateral spars 47, 49 allowing a piano-type union such as Double T-shaped lateral spars, X-shaped lateral spars, Double Lambda-shaped lateral spars, Double Pi-shaped lateral spars, W-shaped lateral spars, Omega-shaped lateral spars, or even a corrugated spar box structure, will be acceptable.

The configuration of the central spars 48 in shape and position depends on the above-mentioned interrupted intermediate frames 33' in order to provide the above-mentioned load transfer, that is, intermediate frames 33' load continuity by means of said central spars 48.

It is considered that this structural design of the pylon 19 reinforces the rear fuselage 17 torsional strength to deal with a failure event such an event of detachment of a propeller blade 15 from an engine 13 causing the failure of a part of any of boxes 41, 51, 61 because the multi-spar structure of said boxes allows maintaining a closed box to withstand the torsion moment produced in said event.

Secondly it is considered that this structural design of the pylon 19 provides a reinforced interface with the fuselage for maintaining the aircraft stability in any failure event.

Although the present invention has been fully described in connection with preferred embodiments, it is evident that modifications may be introduced within the scope thereof, not considering this as limited by these embodiments, but by the contents of the following claims.

The invention claimed is:

1. An aircraft pylon support system mounting and supporting aircraft propulsion systems to a fuselage section of an aircraft which comprises:
an internal, central support box adapted to be disposed within and extend across and through the center of the aircraft fuselage section, and
external support boxes adapted to extend laterally into pylons disposed at both sides of the aircraft fuselage section and adapted to support the propulsion system, each of said internal and external support boxes being made of a composite material and structured as multi-spar boxes containing lateral spars and at least one central spar,
wherein the internal central support box and lateral support boxes are connected together to provide a continuous interface therebetween with a full transfer of loads therebetween and between interrupted, intermediate frame members.

2. The aircraft pylon support system according to claim 1, wherein the internal central support box has the same number of central spars as the number of said interrupted intermediate frame members, said central spars being located in the same fuselage section as said interrupted intermediate frame members to provide load path continuity.

3. The aircraft pylon support system according to claim 2, wherein the internal central support box is disposed within a mid portion of the fuselage section.

4. The aircraft pylon support system according to claim 2, wherein the aircraft propulsion systems are provided with propeller blades.

5. The aircraft pylon support system of claim 1, wherein the fuselage section is located in the aircraft rear fuselage.

6. The aircraft pylon support system according to claim 5, wherein the internal central support box is disposed within a mid portion of the fuselage section.

7. The aircraft pylon support system of claim 1, wherein the internal central support box is placed within a mid fuselage section.

8. The aircraft pylon support system of claim 1, wherein the aircraft propulsion systems have propeller blades.

9. The aircraft pylon support system according to claim 1, wherein the fuselage section is located in a rear portion of the fuselage section.

10. The aircraft pylon support system of claim 1 wherein the fuselage section is provided with a fuselage skin and the internal central support box and external support boxes are provided with upper and lower skins.

11. The aircraft pylon support system according to claim 10, wherein attachment means are provided for attaching the pylon support system together and to the aircraft fuselage section; rows of tension fittings are provided between the upper and lower skins of the external support boxes and the upper and lower skins of the internal central support box with tension bolts crossing the fuselage skin and rows of tension fittings are provided between the lateral spars of the external boxes and the lateral spars of the central box with tension bolts crossing the fuselage skin.

12. The aircraft pylon support system according to claim 11, wherein the attachment means also includes attachment fittings with bolts disposed between the interrupted intermediate frame members and the central spars.

13. The aircraft pylon support system according to claim 12, wherein the fuselage section is located in the aircraft rear fuselage.

14. The aircraft pylon support system according to claim 12, wherein the internal central support box is disposed within a mid portion of the fuselage section.

15. The aircraft pylon support system according to claim 12, wherein the aircraft propulsion systems are provided with propeller blades.

16. The aircraft pylon support system according to claim 11, wherein the fuselage section is located in the aircraft rear fuselage.

17. The aircraft pylon support system according to claim 11, wherein the internal central support box is disposed within a mid portion of the fuselage section.

18. The aircraft pylon support system according to claim 11, wherein the aircraft propulsion systems are provided with propeller blades.

19. The aircraft pylon of claim 1, wherein the internal central support box extends in a straight line across and through the center of the aircraft fuselage section to connect with the lateral external support boxes.

* * * * *